US011436627B2

(12) United States Patent
Dedhia et al.

(10) Patent No.: US 11,436,627 B2
(45) Date of Patent: Sep. 6, 2022

(54) SYSTEMS AND METHODS FOR AGGREGATING AND APPLYING REWARD POINTS

(71) Applicant: VISA INTERNATIONAL SERVICE ASSOCIATION, San Francisco, CA (US)

(72) Inventors: Niraj Dedhia, Austin, TX (US); Aria Pahlavan, Austin, TX (US); Kytana Le, Austin, TX (US); Prakhar Deep, Austin, TX (US); Ashwath Santhanam, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/689,375

(22) Filed: Nov. 20, 2019

(65) Prior Publication Data

US 2021/0150561 A1    May 20, 2021

(51) Int. Cl.
*G06Q 30/00* (2012.01)
*G06Q 30/02* (2012.01)
*H04W 4/029* (2018.01)
*G06Q 20/02* (2012.01)

(52) U.S. Cl.
CPC ......... *G06Q 30/0229* (2013.01); *G06Q 20/02* (2013.01); *G06Q 30/0233* (2013.01); *G06Q 30/0279* (2013.01); *H04W 4/029* (2018.02)

(58) Field of Classification Search
CPC .............. G06Q 30/0229; G06Q 20/02; G06Q 30/0233; G06Q 30/0279; H04W 4/029
See application file for complete search history.

(56) References Cited

U.S. PATENT DOCUMENTS 7,152,042 B1 * 12/2006 Arkes ................... G06Q 30/02
                                                                705/37
2005/0021353 A1 * 1/2005 Aviles ............... G06Q 30/0279
                                                                705/34

(Continued)

OTHER PUBLICATIONS

Signature Systems LLC Granted United States Patent for Online Reward Point Exchange Method and System with User Bids of Rewards for Purchase of a Product, Aug. 14, 2013, Global IP News, Business and Commerce Patent News (Year: 2013).*

*Primary Examiner* — Matthew L Hamilton
(74) *Attorney, Agent, or Firm* — Loeb & Loeb LLP

(57) ABSTRACT

A computer-implemented method includes receiving reward points associated with a first account and a second account held by a consumer from a first issuer computer system and a second issuer computer system. A first conversion factor is applied to convert the reward points for the first account into reward money, and a second conversion factor is applied to converted the reward points for the second account into reward money. The first conversion factor is received from the first issuer computer system, and the second conversion factor is received from the second issuer computer system. The reward money from the first account and the second account are combined to provide aggregated reward money. The consumer is presented with options for using the combined reward points of the first and second accounts for making purchases, donating to charities, or sharing with other consumers from a single, integrated platform.

17 Claims, 12 Drawing Sheets

(56) References Cited

U.S. PATENT DOCUMENTS

| | | | |
|---|---|---|---|
| 2005/0080727 A1* | 4/2005 | Postrel | G06Q 20/10 |
| | | | 705/39 |
| 2006/0064436 A1* | 3/2006 | Fowler | G06Q 10/00 |
| 2008/0249915 A1* | 10/2008 | Manstein | G06Q 40/025 |
| | | | 705/37 |
| 2009/0150237 A1* | 6/2009 | Gupta | G06Q 30/0267 |
| | | | 705/14.64 |
| 2010/0042517 A1* | 2/2010 | Paintin | G06Q 40/12 |
| | | | 705/30 |
| 2012/0271690 A1* | 10/2012 | Urban | G06Q 30/0207 |
| | | | 705/14.15 |
| 2013/0179243 A1* | 7/2013 | Wescott | G06Q 30/0227 |
| | | | 705/14.23 |
| 2014/0304056 A1* | 10/2014 | Postrel | G06Q 30/0601 |
| | | | 705/14.27 |
| 2015/0186918 A1* | 7/2015 | Clarke | G06Q 20/405 |
| | | | 705/14.23 |
| 2016/0104187 A1* | 4/2016 | Tietzen | G06Q 30/0233 |
| | | | 705/14.33 |
| 2018/0075695 A1* | 3/2018 | Simpson | G07F 17/3225 |
| 2021/0150560 A1* | 5/2021 | Gupta | G06Q 30/0641 |

* cited by examiner

SYSTEMS AND METHODS FOR AGGREGATING AND APPLYING REWARD POINTS

TECHNICAL FIELD

Embodiments discussed herein generally relate to systems and methods for aggregating a consumer's reward points from a plurality of accounts, and for applying the aggregated reward points.

BACKGROUND

Reward point programs are a type of loyalty program hosted by numerous businesses such as credit or debit card companies, merchants, and airline companies, for encouraging consumer spending with the hosting business. In a typical reward program hosted by a credit card company, the consumer earns a certain amount of reward points for every unit of currency spent. Once a certain amount of reward points are collected, the consumer may redeem the reward points such as by making purchases, booking flights, or opting to receive cash back. The rewards provide consumers with an incentive to continue spending with the hosting business.

To facilitate consumer spending and to appeal to a broader cross-section of consumers, many businesses hosting reward point programs form partnerships or alliances with other businesses. Credit card companies, for example, may form alliances with certain merchants or airline companies with which consumers may redeem their accumulated reward points. US Patent Application Publication Number 2016/0048864 describes a third party digital wallet that allows a consumer to check out with reward points when making purchases on a merchant website.

However, many consumers do not redeem all of their reward points, and the reward money may be left stagnant and unused. Some consumers may lose track of their reward points, particularly if they participate in numerous reward point programs. In addition, consumers may neglect their reward points when not enough have been accumulated to make a meaningful purchase. Thus, there is a need for improved systems that facilitate reward point tracking and use.

SUMMARY

Embodiments disclosed herein provide a technical solution to the above challenges by providing a single platform through which consumers may track their reward points from multiple accounts, combine their reward points from multiple accounts, and apply their combined reward points for purchases, charity donation, and exchange with other consumers. In one embodiment, a computer-implemented method includes registering a first account and a second account of a consumer in a reward point aggregator system, and receiving reward points associated with the first account from a first issuer computer system and reward points associated with the second account from a second issuer computer system. The first issuer computer system may be associated with an issuer of the first account, and the second issuer computer system may be associated with an issuer of the second account. The computer-implemented method further includes converting the reward points associated with each of the first account and the second account into reward money using a first conversion factor for the first account and a second conversion factor for the second account, combining the reward money of the first account and the second account to provide aggregated reward money, and displaying a rewards store to the consumer at a display interface of a computer device. The rewards store may have one or more merchant products and/or services available for purchase by the consumer with the aggregated reward money.

In another embodiment, a reward point aggregator system for aggregating reward points for a first account and a second account held by a consumer includes a processor physically configured according to computer-executable instructions, a memory physically configured to store computer-executable instructions, and an input-output circuit in communication with the processor. The system further includes an issuer interface module configured to interface with a first issuer computer system associated with the first account and a second issuer computer system associated with the second account, and to receive reward points associated with each of the first and second accounts from each of the respective first and second issuer computer systems. In addition, the system further includes an aggregator module configured to convert the reward points associated with each of the first account and the second account into reward money using a first conversion factor for the first account and a second conversion factor for the second account, and to combine the reward money from the first account and the second account to provide aggregated reward money.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated.

Figure 1:
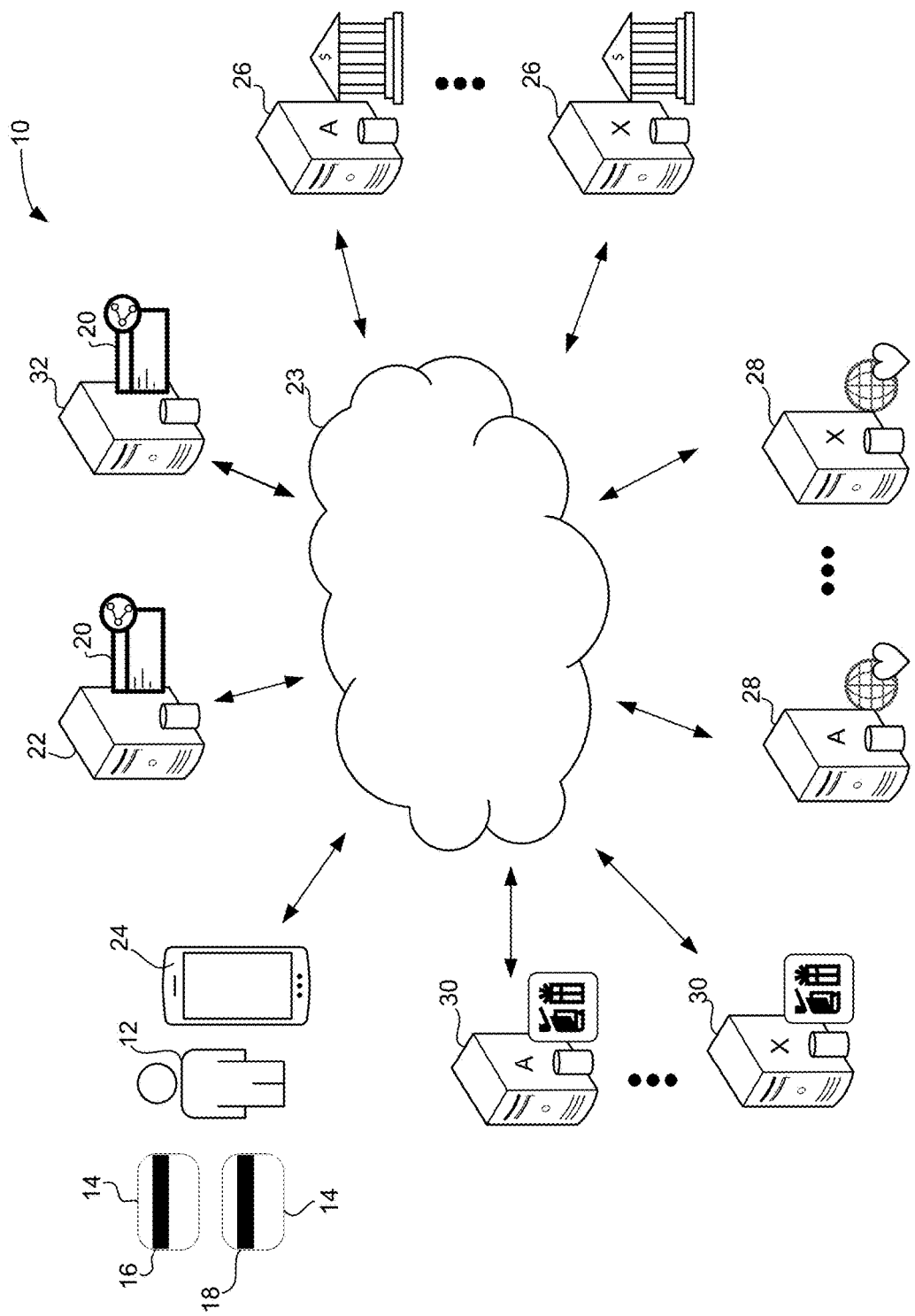
FIG. 1 is a schematic representation of a reward point aggregator system, according to one embodiment.

Referring now to the drawings and with specific reference to FIG. 1, a reward point aggregator system 10 is shown. The reward point aggregator system 10 may include a website or downloadable application that allows a consumer 12 to track and aggregate reward points associated with a plurality of accounts 14 such as credit card accounts, debit card accounts, membership accounts, or other types of accounts having a reward point program. The plurality of accounts 14 may at least include a first account 16 and a second account 18. Additionally, the reward point aggregator system 10 allows the consumer 12 to use the reward points for making purchases from various merchants, for making donations to verified charity organizations, and/or for transferring the reward points to other consumers participating in the reward point aggregator system 10. In some embodiments, the reward point aggregator system 10 may be hosted by an operating entity 20, such as a credit card network, associated with at least one of the accounts 14 held by the consumer 10. In such embodiments, the operating entity 20 of the reward point aggregator system 10 may also be involved in processing payments associated with at least one of the accounts 14 held by the consumer 12. As explained further below, the primary functions of the reward point aggregator system 10 may be performed by one or more processors of a point aggregator computer system 22.

The reward point aggregator system 10 may include a number of computer-based entities that communicate over one or more communication networks 23 such as the Internet (wide area network (WAN) and Ethernet (local area network (LAN)). These entities may include, but are not limited to, the point aggregator computer system 22 and a computer device 24 of the consumer 12, such as a smartphone, a tablet, or a personal computer. Other entities include issuer computer systems 26 (e.g., issuer computer system 26-A through issuer computer system 26-X) each associated with an issuer such as a bank or financial institution of one of the accounts 14, charity computer systems 28 (e.g., charity computer system 28-A through charity computer system 28-X) each associated with a charity organization participating in the reward point aggregator system 10, and merchant computer systems 30 (e.g., merchant computer system 30-A through merchant computer system 30-X) each associated with a merchant or other business that markets their products or services in the reward point aggregator system 10. A processing network computer system 32 associated with the operating entity 20 may also participate in the reward point aggregator system 10. The processing network computer system 32 may be associated with a payment processing network that processes transaction authorization requests involving one or more of the consumer's accounts 14. An example of such a processing network includes VisaNet™ which processes credit card transactions, debit card transactions, and other types of account transactions.

The consumer 12 may enroll in the reward point aggregator system 10 in person or via the computer device 24 by establishing a unique username and password, and by submitting personal data such as name, birthdate, phone number, and address. Upon successful enrollment, the consumer 12 may register each of the accounts 14 in the system 10 by entering the respective account details such as account number identifier (e.g., personal identification number (PAN)), and expiration date. The account details and the consumer's unique login and password may be stored in the point aggregator computer system 22.

Figure 2:
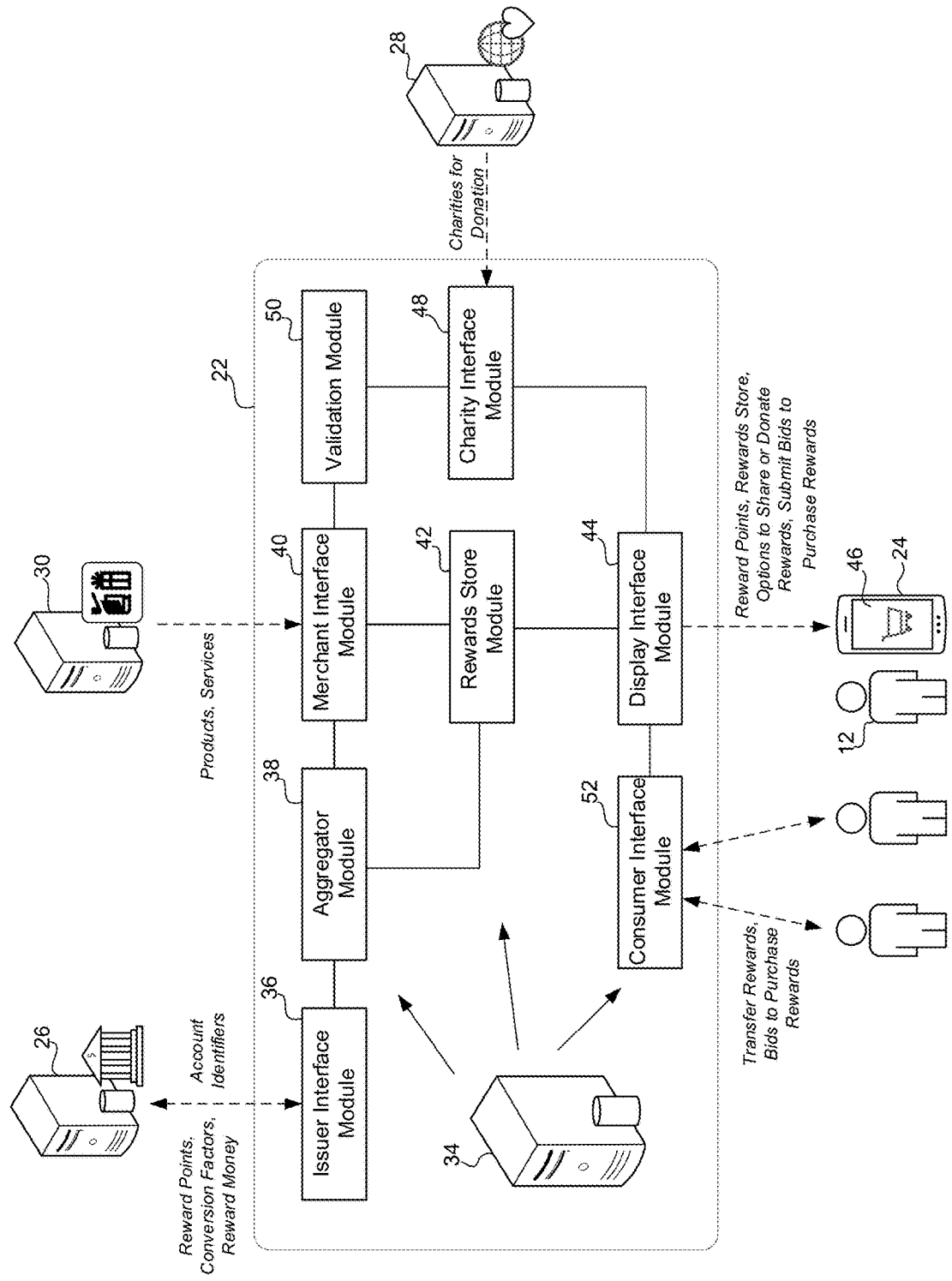
FIG. 2 is a schematic representation of a point aggregator computer system of the reward point aggregator system, according to one embodiment.

The point aggregator computer system 22 and some of its interactions with other entities of the reward point aggregator system 10 are shown in FIG. 2. The point aggregator computer system 22 may include one or more processors 34 having modules each implementing some of the functions of the reward point aggregator system 10. The point aggregator computer system 22 may include an issuer interface module 36 that interfaces with each of the issuer computer systems 26 associated with each of the consumer's accounts 14. The issuer interface module 36 may provide the issuer computer system 26 with the respective account identifier to locate the respective account 14, and the issuer computer system 26 may provide the issuer interface module 36 with the current accumulated reward points for the respective account 14, as well as the money value to reward point conversion factor specific to the respective account 14 (e.g., 1 dollar/1 reward point, 0.5 dollars/reward point, etc.). Furthermore, each of the issuer computer systems 26 may transmit updates to the issuer interface module 36 as more reward points are accumulated on the respective account 14, and/or as the reward point valuations change with time. The issuer interface module 36 may also receive reward money from the issuer computer systems 26 as the consumer 12 spends or applies the reward points through the reward point aggregator system 10.

An aggregator module 38 may receive the reward points and the conversion factors for each account 14 from the issuer interface module 36, and may combine or aggregate the reward points of the accounts 14 to provide the aggregated (or total) reward money for use by the consumer 14. Specifically, the aggregator module 38 may convert the reward points associated with each of the accounts 14 into reward money using the respective reward point to money value conversion factor, and sum the reward money of the accounts 14 to provide the aggregated reward money. In one specific example in which the consumer 12 has two accounts (the first account 16 and the second account 18), the aggregator module 38 may calculate the aggregated reward money according to equation (1) below where $RP_1$ is the number of accumulated reward points associated with the first account 16, $CF_1$ is the money value to reward point conversion factor associated with the first account 16, $RP_2$ is the number of accumulated reward points associated with the second account 18, and $CF_2$ is the money value to reward point conversion factor associated with the second account 18. Accordingly, the aggregator module 38 computes the product of the number of accumulated reward points and the conversion factor for each account to determine the reward money for each account, and sums the reward money of all of the accounts 14.

$$\text{Aggregated Reward Money} = RP_1(CF_1) + RP_2(CF_2) \quad (1)$$

The point aggregator computer system 22 further includes a merchant interface module 40 that interfaces with the merchant computer systems 30 to receive products and services that the respective merchants want to list for sale through the reward point aggregator system 10. A rewards store module 42 in communication with the merchant interface module 40 may receive the products and services from the merchant interface module 40, and determine whether each of the products and services are approved for purchase based on the consumer's aggregated reward money amount. That is, only those products and services having a price that is equal to or less than the aggregated reward money will be approved by the rewards store module 42. The rewards store module 42 may populate a rewards store with the approved merchant products and services available for purchase by the consumer 12 with the combined reward points. Those products and services which are not approved may be stored by the merchant interface module 40 and/or the rewards store module 42 for later use as the consumer 12 accumulates more reward points. Issuer changes in the valuations of reward points and/or changes in the number of accumulated reward points may result in more or fewer products and services available for purchase in the rewards store. In alternative embodiments, all of the products and services provided by the merchant interface module 40 may populate the rewards store regardless of the aggregated reward money amount. In such embodiments, if the consumer 12 does not have sufficient points to purchase a selected product or service, the consumer 12 is provided with an option to pay the difference using other sources of money (e.g., cash, credit card, debit card, check, etc.).

A display interface module 44 may display content related to tracking and applying the consumer's rewards on a display interface 46 of the computer device 24. The display interface module 44 may display the accumulated reward points associated with each of the consumer's accounts 14, allowing the consumer 12 to track his or her reward points from a single platform. Additionally, the display interface module 44 may display the rewards store at the display interface 46, allowing the consumer 12 to spend the aggregated reward money (or combined reward points) on selected merchant products or services.

A charity interface module 48 may interface with the charity computer systems 28, and may receive information on charities from the charity computer systems 28. The display interface module 44 may display options to donate the reward money to the charity organizations at the display interface 46, provided that the charity organizations pass an approval process that confirms their legitimacy. In this regard, the point aggregator computer system 22 may further include a validation module 50 that performs operations to verify the legitimacy of charity organizations seeking to participate in the reward point aggregator system 10. Likewise, the validation module 50 may also verify the legitimacy of merchants and businesses seeking to market their products and services in the reward point aggregator system 10. Only those charity organizations and/or merchants that are determined to be legitimate will be permitted to list their charity, products, and/or services in the reward point aggregator system 10. In other arrangements, personnel employed by or associated with the operating entity 20 of the reward point aggregator system 10 may perform research to verify the legitimacy of the charities and/or merchants and businesses seeking to participate in the reward point aggregator system 10.

The point aggregator computer system 10 may further include a consumer interface module 52 that may interface with other consumers enrolled in the reward point aggregator system 10. More particularly, the consumer interface module 52 may perform operations allowing the consumers enrolled in the system 10 to share or transfer reward points between each other, and to submit bids to purchase reward points from each other. In some embodiments, the consumer 12 may receive bids on his or her reward points from other consumers, and/or may submit bids to purchase the reward points of other consumers.

Although the functions of the point aggregator system 10 are described as being performed by multiple discrete modules, it will be understood that the above-described functions may be performed by a single module, or may be shared or distributed differently over more or less modules and/or processing systems in alternative embodiments. Such alternative embodiments fall within the scope of the present disclosure.

Figure 3:
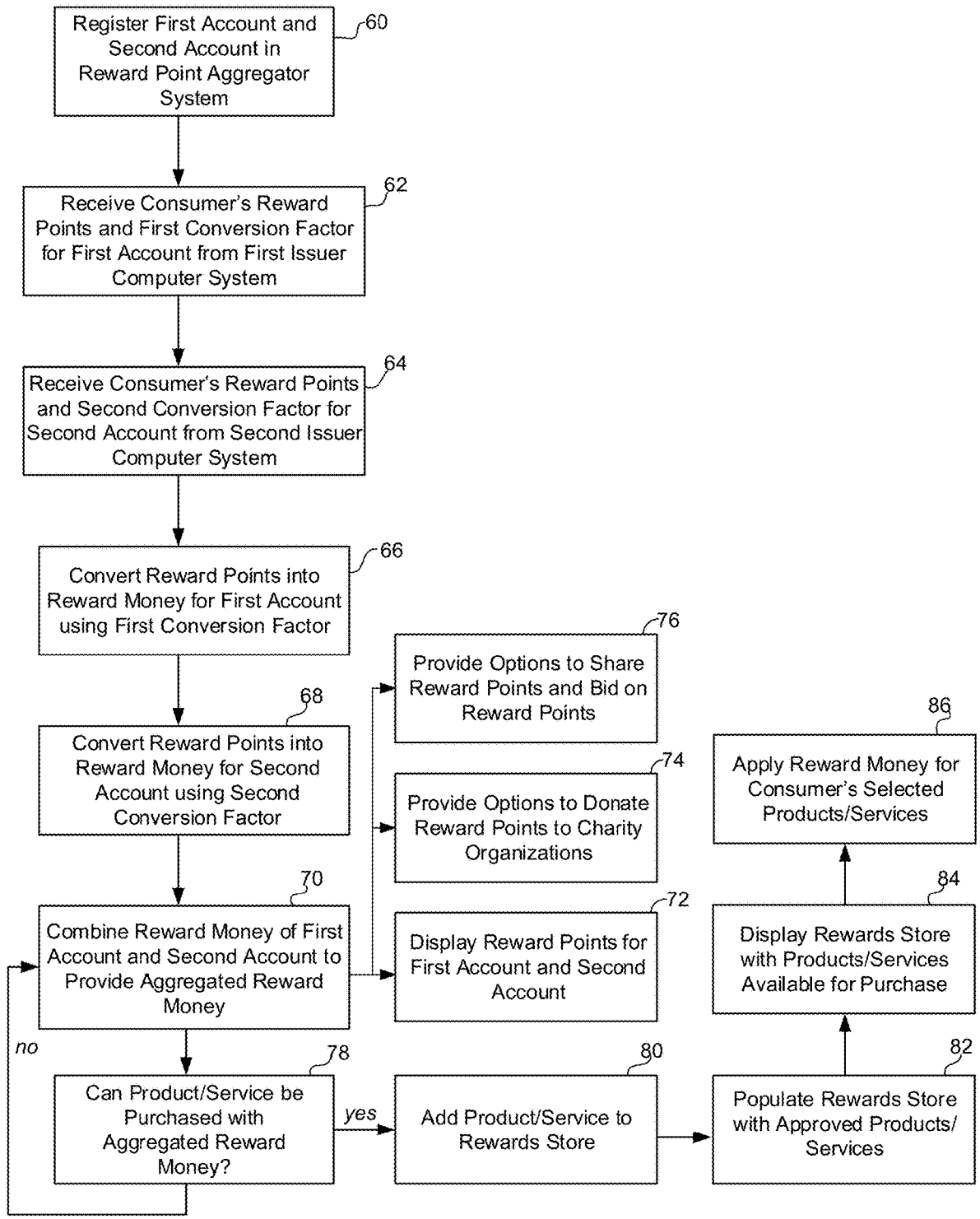
FIG. 3 is a flow chart of a computer-implemented method for aggregating and applying a consumer's reward points as performed by the point aggregator computer system, according to one embodiment.

An exemplary method for aggregating and applying the consumer's reward points from the first account 16 and the second account 18, as performed by the point aggregator computer system 22, is shown in FIG. 3. At a first block 60, the first account 16 and the second account 18 may be registered in the reward point aggregator system 10 when the consumer 12 submits account details (e.g., account identifiers, expiration dates, etc.) associated with each of the accounts 16 and 18. The point aggregator computer system 22 may store the account details, and use the account details to identify the consumer's account when requesting or receiving information from the respective issuer computer systems 26. At a block 62, the point aggregator computer system 22 may receive the reward points and a first money value to reward point conversion factor from a first issuer computer system 26 associated with the first account 16. Likewise, at a block 64, the point aggregator computer system 22 may receive the reward points and a second money value to reward point conversion factor from a second issuer computer system 26 associated with the second account 18. The blocks 62 and 64 may be carried out in different orders, or simultaneously.

The reward points for the first account 16 may be converted into reward money according to a block 66 by multiplying the number of reward points of the first account 16 by the first money value to reward point conversion factor. In a similar way, the reward points for the second account 18 may be converted into reward money according to a block 68. The reward money of the first account 16 may be combined with the reward money of the second account 18 to provide aggregated reward money, according to a block 70. At a block 72, the reward points for each of the first and second accounts 16 and 18 may be displayed at the display interface 46, allowing the consumer 12 to track the accumulated reward points. Additionally, the point aggregator computer system 22 may provide the consumer 12 with options at the display interface 46 to donate all or a portion of the reward points to one or more verified charity organizations (block 74). The point aggregator computer system 22 may also provide the consumer 12 with options to share all or a portion of the reward points with other consumers 12 enrolled in the reward point aggregator system 10, and to accept/reject bids on the reward points from other consumers and/or place bids on other consumer's reward points (block 76).

Each of the merchant products and/or services may be approved for placement in the consumer's rewards store based on whether the product or service can be purchased with the aggregated reward money (block 78). If the aggregated reward money is sufficient to purchase the merchant product or service, the product or service may be added to the consumer's rewards store to populate the rewards store with approved products and services (blocks 80 and 82). If the product or service cannot be purchased with the aggregated reward money, the product or service may be stored in the computer system 22 until the consumer accumulates enough reward points to purchase the product or service. The rewards store having products and services available for purchase by the consumer 12 may be displayed at a block 84. The reward money may be applied for purchasing products and/or services selected by the consumer 12 according to a block 86. The block 86 may involve deducting the reward money from the consumer's accounts 16 and/or 18 that were used to make the purchase.

As will be appreciated, an extension of the method of FIG. 3 may be applied when the consumer 12 has more than two accounts enrolled in the reward point aggregator system 10. Additionally, it will be understood that the order of the steps shown in FIG. 3 and described above is exemplary, and that the steps may be carried out in different orders or simultaneously in practice.

Figure 4:
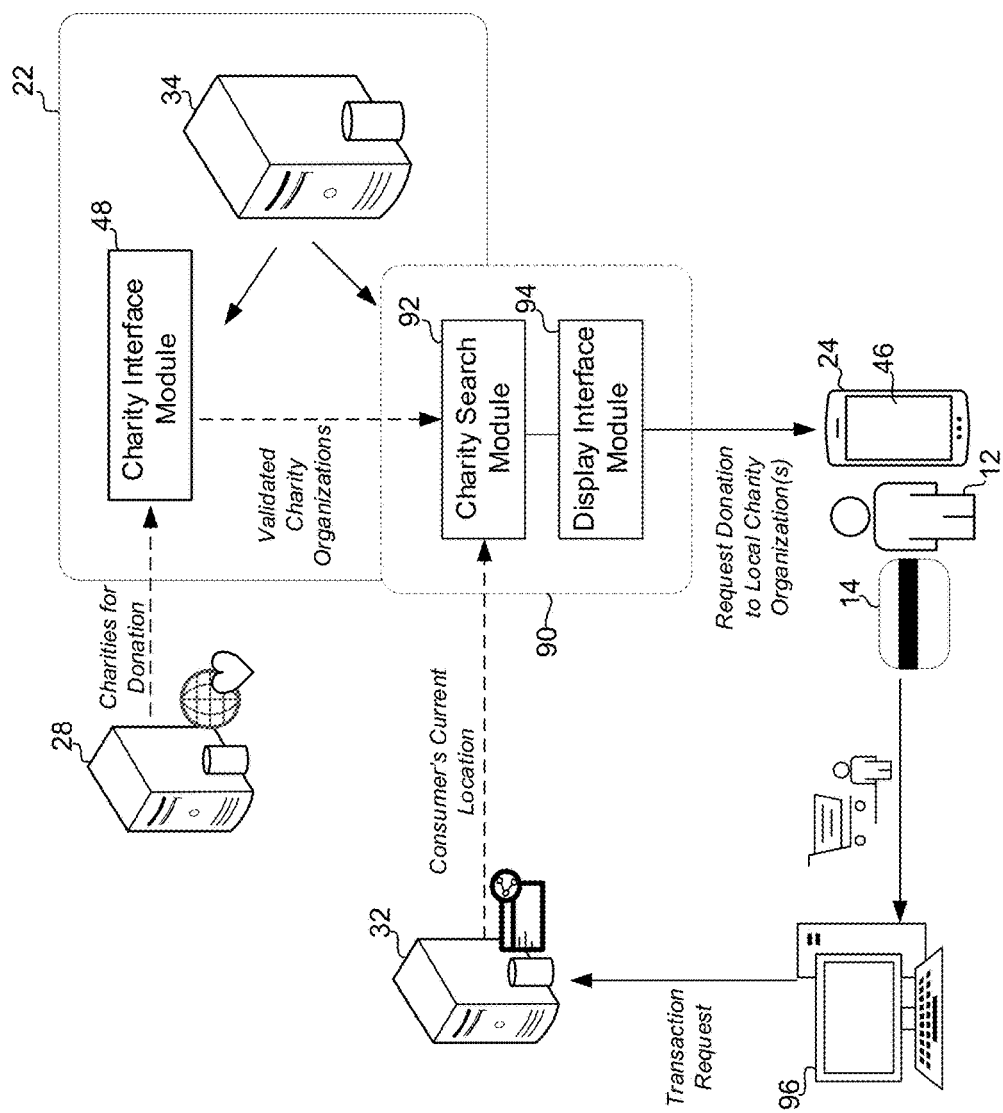
FIG. 4 is a schematic representation of a charity computer system of the reward point aggregator computer system, according to one embodiment.

Turning to FIG. 4, the reward point aggregator system 10 may include a charity ("sharity") computer system 90 that is integrated with or part of the point aggregator computer system 22. Specifically, the one or more processors 34 of the point aggregator computer system 22 may have modules that carry out the functions of the charity computer system 90. The charity computer system 90 may include a charity search module 92 that interfaces with the charity interface module 48, and a display interface module 94 that displays content at the display interface 46 of the consumer's computer device 24. When the consumer 12 makes a purchase at a merchant store or a merchant website using the account 14 associated with the operating entity 20, the merchant's payment terminal 96 may transmit a transaction request to the processing network computer system 32. In addition to performing purchase approval, the processing network computer system 32 may transmit the consumer's current geographic location to the charity search module 92. The charity search module 92 may search the collection of verified charity organizations in the charity interface module 48 for those that are at or near the consumer's current geographic location. If any local charity organizations are identified, the display interface module 94 may send a notification to the consumer's computer device 24 indicating the number of reward points he or she has available in the reward point aggregator system 10, and requesting donation of reward points to the identified local charity organizations. The donation request may be received by the consumer 12 via email, text, or other notification received through the reward point aggregator system 10. If the consumer 12 agrees to make a donation, the consumer 12 may indicate how many reward points to donate to selected local charity organizations. The point aggregator computer system 22 may collect the corresponding amount of reward money from the consumer's accounts 14 via the respective issuer computer systems 26, and distribute the funds to the selected local charity organizations.

Figure 5:
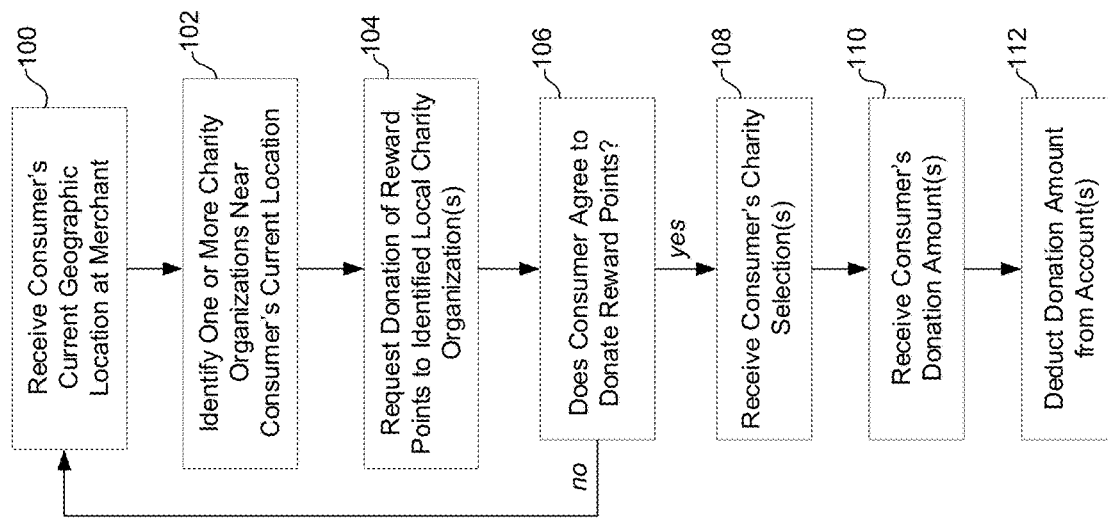
FIG. 5 is a flow chart of a computer-implemented method as performed by the charity computer system of FIG. 4, according to one embodiment.

FIG. 5 shows an exemplary method for applying the consumer's reward points for local charity donation as performed by the charity computer system 90. Initially, the charity computer system 90 may receive the consumer's current geographic location from the processing network computer system 32 as the consumer checks out at the merchant payment terminal 96 when making a purchase (block 100). The charity computer system 90 may then identify one or more charity organizations near the consumer's current geographic location within the collection of verified charity organizations stored in the charity interface module 48 (block 102), and submit a request to the consumer 12 for donation of reward points to the identified local charity organizations (block 104). A next block 106 may involve receiving input from the consumer 14 accepting or declining the donation. If the consumer 12 declines, the method repeats when the consumer 12 makes another purchase at a merchant payment terminal 96.

If the consumer 12 agrees to make a donation, the consumer's selection of the one or more local charity organizations, and desired donation amount (in terms of reward points) to each of the selected local charity organizations is received (blocks 108 and 110). At a following block 112, the consumer's donation amount is deducted from the corresponding account(s) 14 via the corresponding issuer computer system(s) 26, and provided to the selected local charity organizations.

Figure 6:
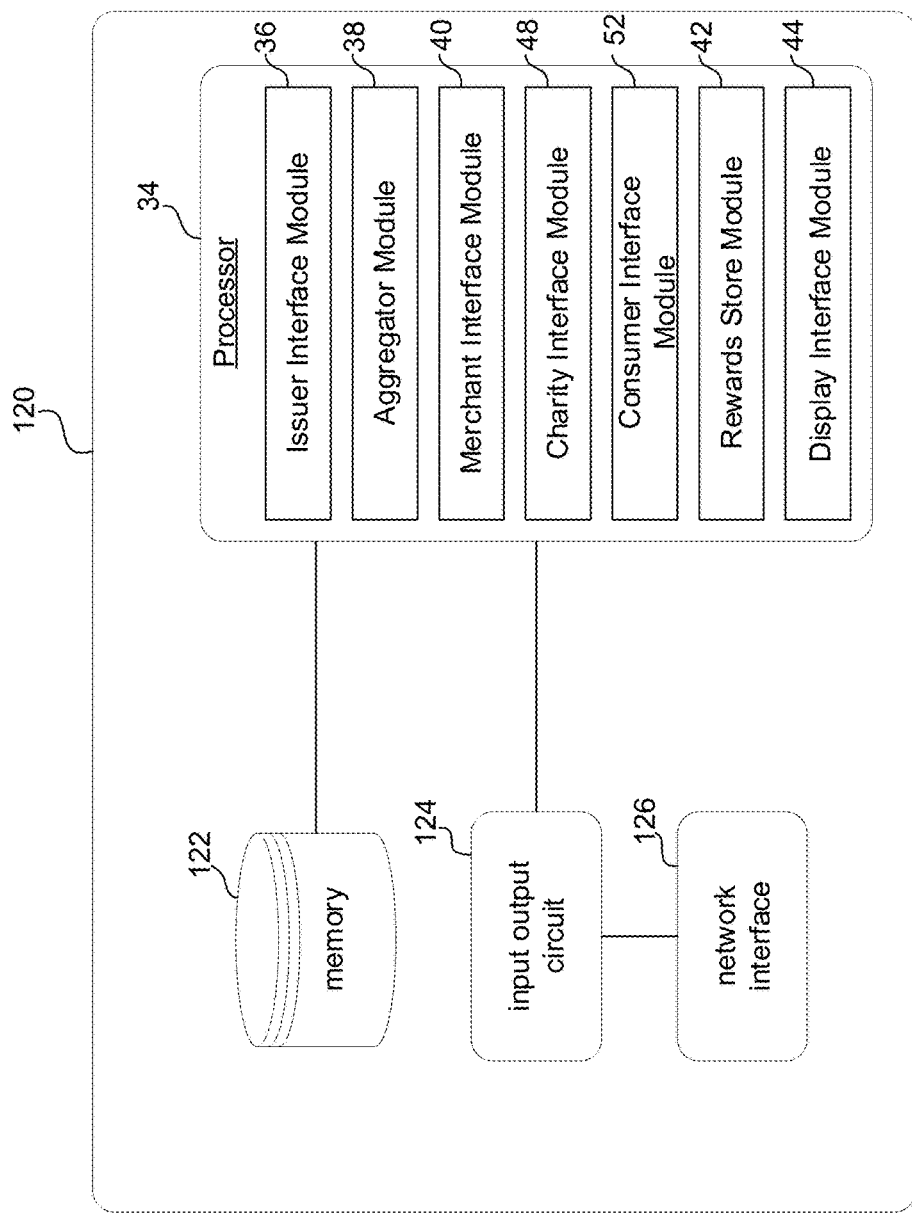
FIG. 6 is a schematic representation of a computer device configured to perform at least some of the functions of the reward point aggregator system, according to one embodiment.
Figure 7:
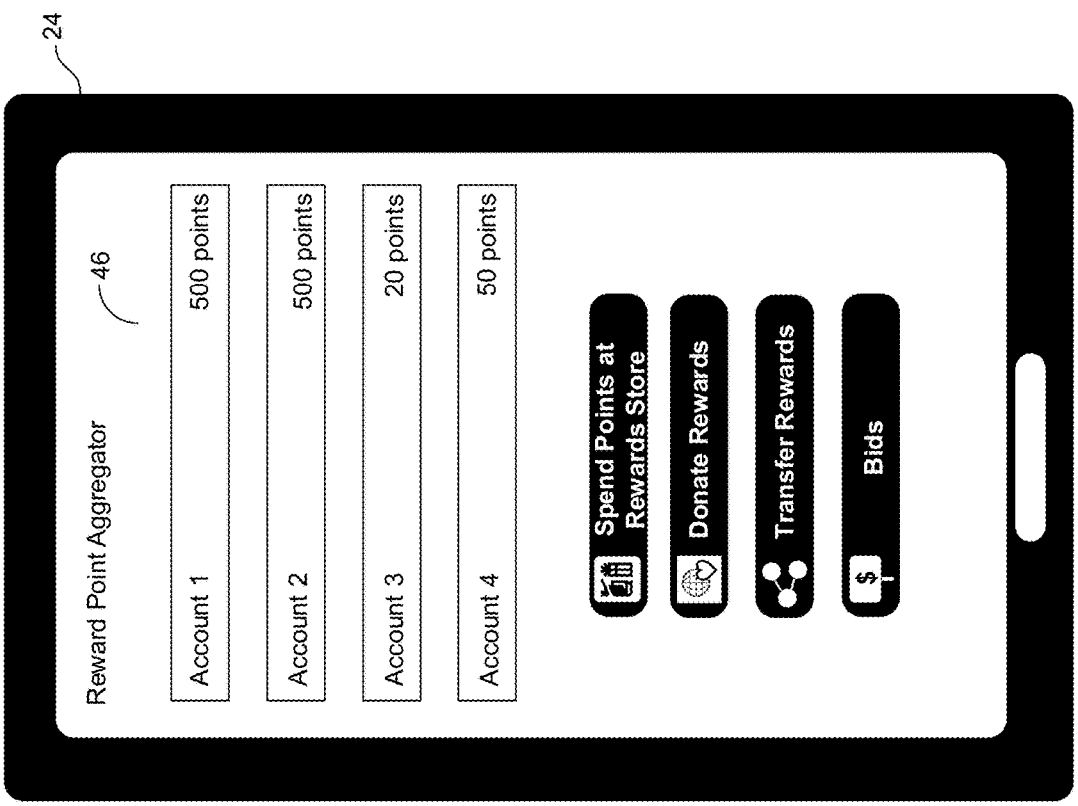
FIG. 7 is an exemplary display interface of the reward point aggregator system as viewed at a computer device of the consumer, according to one embodiment.

Turning to FIG. 6, an exemplary a computer device 120 configured to perform at least some of the functions of the reward point aggregator system 10 is shown. In one embodiment, the computer device 120 may be representative of a computer device used to operate the point aggregator computer system 22. The computer device 120 may include the one or more processors 34 configured according to computer-executable instructions for carrying out at least some of the functions of the point aggregator computer system 22. In one embodiment, the one or more processors 34 may include some or all of the modules that perform the functions described above in reference to FIGS. 2 and 4. The computer device 120 may further include a memory 122 configured to store the computer-executable instructions and assist the processor 34. An input-output circuit 124 may be in communication with the processor 34, and may be involved in receiving inputs (e.g., reward points, conversion factors, merchant products/services, etc.), and providing outputs (e.g., reward points, rewards store, charity donation requests, etc.). A network interface 126 associated with the input-output circuit 124 to enable communication with other entities participating in the reward point aggregator system 10 over the communication network 23.

Figure 8:
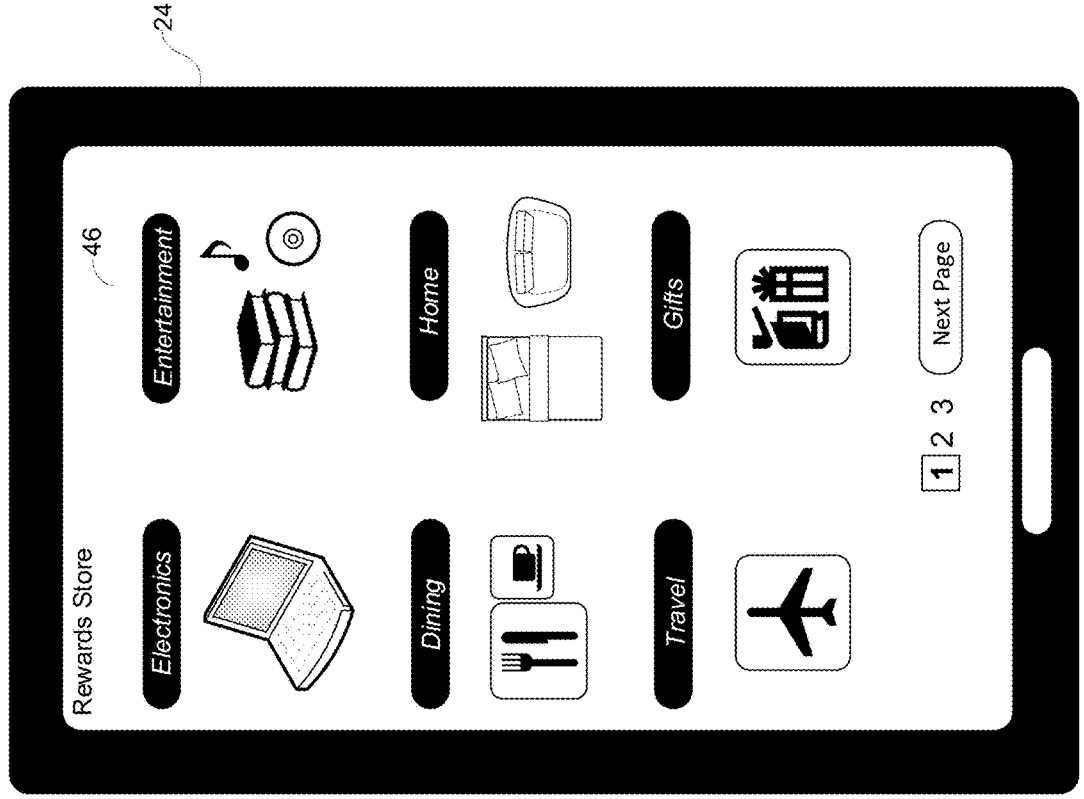
FIG. 8 is another exemplary display interface of the reward point aggregator system as viewed at the consumer's computer device, according to one embodiment.

FIGS. 7-12 are exemplary display interfaces 46 as viewed from the consumer's computer device 24 when participating in the reward point aggregator system 10. After logging in to the system 10, the consumer 12 may view the reward points accumulated for each of the accounts 14 that are registered in the system 10 from the display interface 46 (see FIG. 7). The consumer 12 may be provided with a number of selection options for spending or applying the accumulated reward points at the display interface 46 (see FIG. 7). For instance, the consumer 12 may select to spend the reward points at the rewards store, to donate the reward points to verified charity organizations, to transfer reward points to other consumers enrolled in the system 10, and/or to receive or place bids on reward points. An exemplary rewards store is shown in FIG. 8 in which the consumer 12 may spend the reward points on selected products or services. The products and services may be organized in categories such as, but not limited to, electronics, entertainment, dining, home, travel, gifts, clothing, toys, and automotive. The items in each category may be listed with a price in terms of reward points, or in terms of currency.

Figure 9:
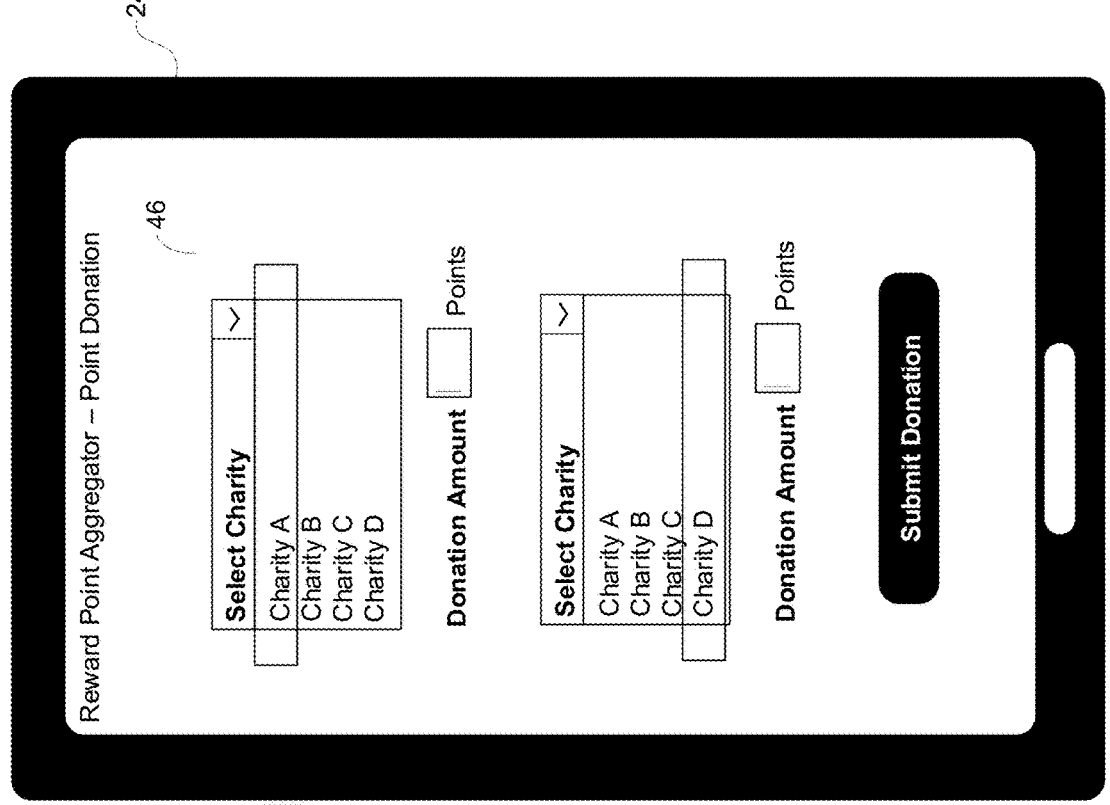
FIG. 9 is another exemplary display interface of the reward point aggregator system as viewed at the consumer's computer device, according to one embodiment.
Figure 10:
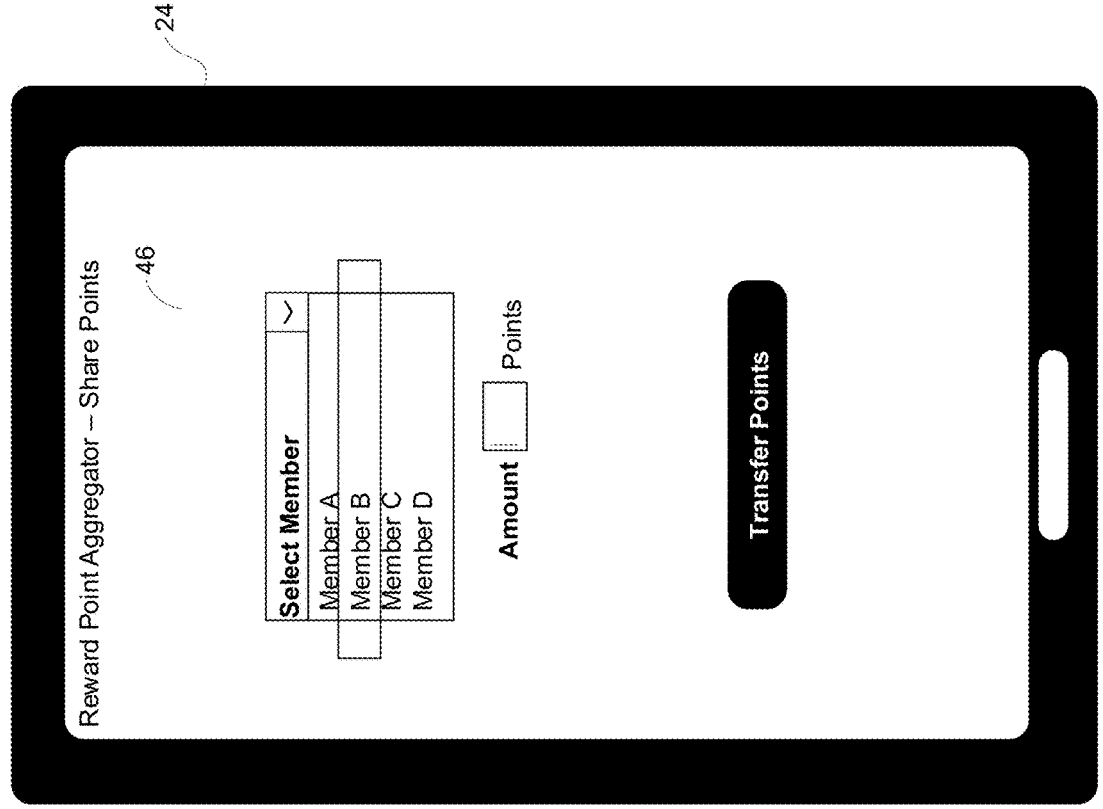
FIG. 10 is another exemplary display interface of the reward point aggregator system as viewed at the consumer's computer device, according to one embodiment.
Figure 11:
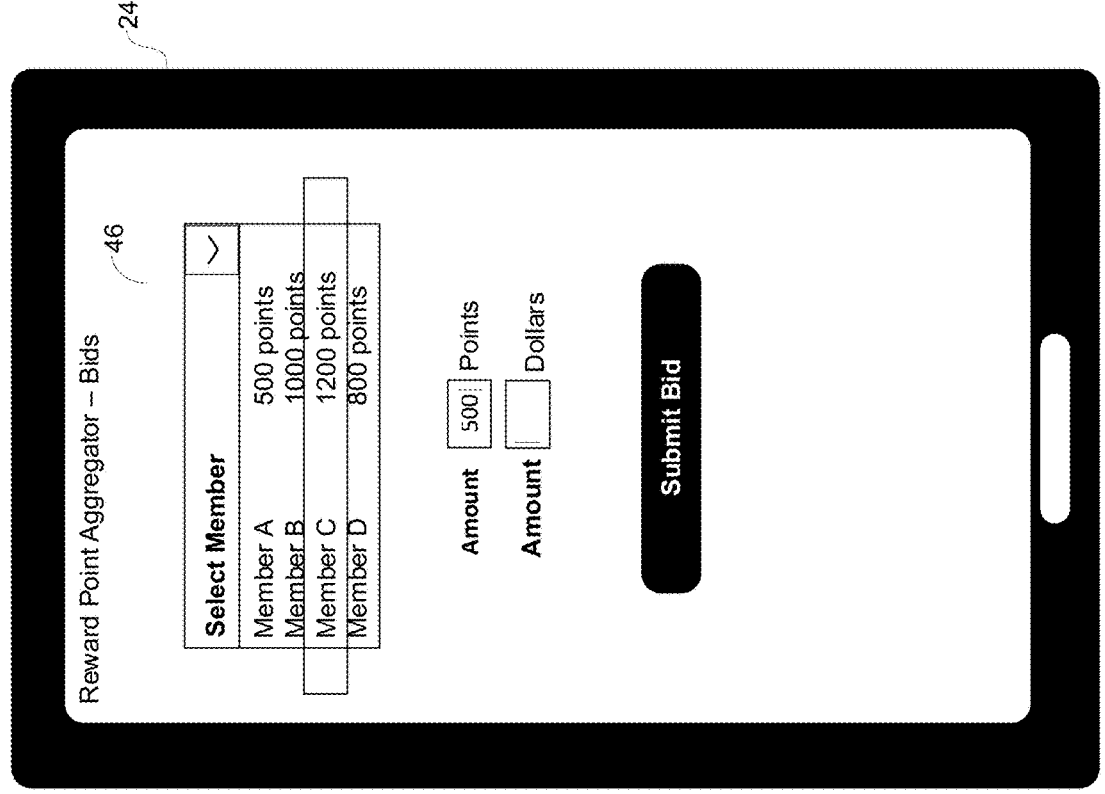
FIG. 11 is another exemplary display interface of the reward point aggregator system as viewed at the consumer's computer device, according to one embodiment.
Figure 12:
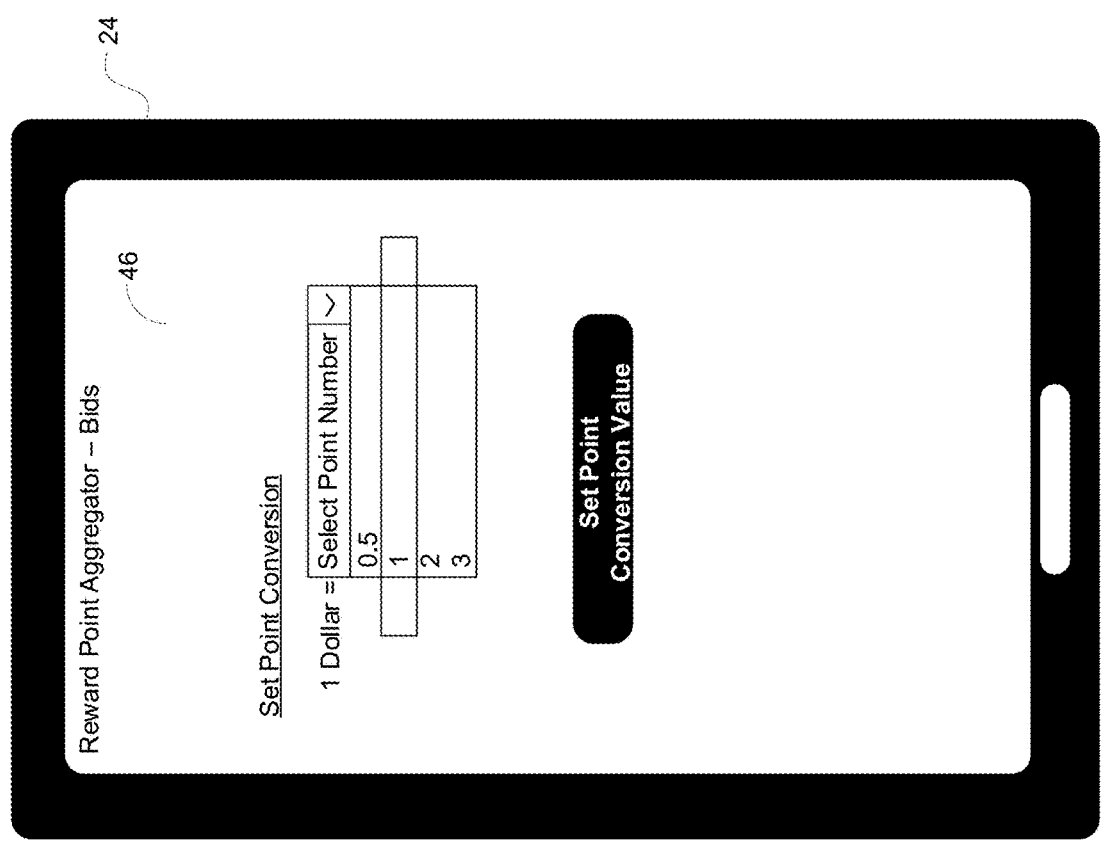
FIG. 12 is another exemplary display interface of the reward point aggregator system as viewed at the consumer's computer device, according to one embodiment.

Referring to FIG. 9, if the consumer 12 chooses to donate reward points to charity organizations, the consumer 12 may select a desired charity organization from a list of verified charity organizations and input the desired amount of reward points to donate to each selected charity organization. Referring to FIG. 10, the consumer 12 may transfer or share a chosen amount of reward points with other selected consumers enrolled in the reward point aggregator system 10 via the display interface 46. In some embodiments, the consumer 12 may link his or her account in the reward point aggregator system 10 with the accounts of other selected consumers to facilitate exchange of reward points between the linked consumers. Additionally, the consumer 12 may place bids on reward points of other consumers enrolled in the reward point aggregator system 10 at the display interface 46 (see FIG. 11). Specifically, the consumer 12 may view the reward points of other consumers, select the consumer's reward points on which he or she would like to place a bid, and input the amount of reward points and bid amount in currency to place on the selected consumer's reward points (see FIG. 11). In one embodiment, the consumer 12 may set a money value to reward point conversion factor for other consumers in the system 10 to bid to purchase the reward points from the consumer 12 (see FIG. 12). For example, if the consumer 12 wishes to clear out reward points, he or she may set a lower money value to reward point conversion factor (e.g., 1 dollar/3 reward points), and if the consumer 12 wishes to profit on reward points, he or she may set a higher money value to reward point conversion factor (e.g., 1 dollar/0.5 reward points). It will be appreciated that the display interfaces of FIGS. 7-12 are merely exemplary, and may have more or less features in practice.

In some embodiments of the reward point aggregator system 10, the consumer 12 may spend, transfer, or donate his or her rewards in terms of reward points, and may be unaware of the total amount of aggregated award money available in the system 10. In such embodiments, the consumer 12 may only be concerned with tracking and spending or using up the combined reward points. The conversion to reward money may only be used internally by the system 10 to facilitate transactions. In other embodiments, the consumer 12 may be informed of the total amount of aggregated reward money available, and/or may spend, transfer, or donate his or her rewards in terms of reward money.

The reward point aggregator system of the present disclosure allows consumers to access their reward points from multiple accounts in one platform, promotes the use of all of the consumer's accumulated reward points from various accounts, and avoids reward point waste or nonuse. The system interfaces with account issuer computer systems to obtain reward points and reward point valuations on its own, such that the consumer may only be concerned with tracking and using the accumulated reward points. Additionally, the system encourages use of reward points that consumers might otherwise lose track of or neglect. By combining the reward points from multiple accounts, the consumer may purchase more valuable items that might not otherwise be available on the individual accounts. In other words, combining the reward points allows the consumer to make use of reward points on accounts where only a small number of reward points have been accumulated. The reward point aggregator system of the present disclosure leverages merchant or company alliances with the operating entity, thereby providing the consumer with a number of options for spending the combined reward points. The system also benefits merchants by providing an avenue to market their products and services. Even further, the system internally verifies the legitimacy of participating charity organizations, and informs the consumer of any local, valid charity organizations to which the reward points can be donated. Moreover, the system provides a central platform for consumers enrolled in the reward point aggregator system to exchange reward points with each other, and to place bids on each other's reward points.

What is claimed is:

1. A computer-implemented method performed by a point aggregator computer system of a reward point aggregator system, comprising:

receiving, via one or more processors of a point aggregator computer system, registration information of a first account and a second account of a consumer from a user computer device having a display interface, wherein the registration information is used to enroll the consumer into a rewards account with the reward point aggregator system;

receiving, via the one or more processors, reward points associated with the first account from a first issuer computer system and reward points associated with the second account from a second issuer computer system over a network, the first issuer computer system being associated with an issuer of the first account, and the second issuer computer system being associated with an issuer of the second account;

transmitting, via the one or more processors, the reward points associated with each of the first account and the second account of the consumer to the user computing device for display at the display interface;

displaying, at the display interface via the one or more processors, a display interface tool to the consumer on a display screen;

receiving, via the one or more processors from the display interface tool displayed on the display screen, an entered conversion factor for a first portion of the reward points of the first account and/or the second account, wherein the consumer can increase or decrease the conversion factor;

linking, via the one or more processors, the rewards account for the consumer with a rewards account of a second consumer enrolled in the reward point aggregator system;

receiving, via the one or more processors, a bid from the second consumer to purchase the first portion of the reward points of the first account and/or the second account of the consumer based on the conversion factor entered by the consumer;

transferring, via the one or more processors, the first portion of the reward points of the first account and/or the second account of the consumer's rewards account to the rewards account of the second consumer;

converting, via the one or more processors, a second portion of the reward points associated with the first account and/or the second account into reward money by applying a first conversion factor for the first account and a second conversion factor for the second account;

combining, via the one or more processors, the reward money of the first account and the second account to provide aggregated reward money;

identifying, via the one or more processors, one or more charity organizations near the consumer's current geographic location;

transmitting, via the one or more processors, one or more selection options for a consumer to donate all or a portion of the second portion of the rewards points of the first account and/or the second account to the one or more charity organizations to be displayed on the display interface of the user computer device;

receiving, via the one or more processors, a selection of the one or more charity organizations and a portion or all of the second portion of the reward points of the first account and/or the second account to be donated to the one or more charity organizations from the user computer device;

in response to the selection of the one or more charity organizations and a portion or all of the second portion of the reward points of the first account and/or the second account to be donated, deducting the portion or all of the second portion of the reward points of the first account and/or the second account to be donated from the first account and the second account; and transmitting, via the one or more processors, the reward money associated with the donated rewards points to the one or more charity organizations.

2. The computer-implemented method of claim 1, further comprising displaying the reward points associated with each of the first account and the second account to the consumer at the display interface.

3. The computer-implemented method of claim 1, further comprising displaying the aggregated reward money to the consumer at the display interface.

4. The computer-implemented method of claim 1, further comprising applying the reward points of the first account and the second account for purchase of one or more merchant products and/or services in a rewards store selected by the consumer.

5. The computer-implemented method of claim 1, further comprising confirming a legitimacy of each of the one or more charity organizations prior to providing the consumer with the one or more selection options.

6. The computer-implemented method of claim 1, further comprising confirming a legitimacy of each of the one or more charity organizations prior to transmitting a request to the consumer for donation to the one or more charity organizations.

7. The computer-implemented method of claim 1, further comprising providing the consumer with an option at the display interface to share at least a portion of the reward points of the first account or the second account with a second consumer.

8. The computer-implemented method of claim 1, further comprising allowing a second consumer to submit a bid to purchase the reward points from the consumer.

9. A point aggregator computer system of a reward point aggregator system for aggregating reward points for a first account and a second account held by a consumer, comprising:

a processor physically configured according to computer-executable instructions;

a memory physically configured to store computer-executable instructions and assist the processor;

an input-output circuit in communication with the processor;

an issuer interface module configured to interface with a first issuer computer system associated with the first account and a second issuer computer system associated with the second account, and to receive reward points associated with each of the first account and the second account, wherein the reward points of each of the first account and the second account are registered with the reward point aggregator system and the consumer is enrolled in a rewards account with the reward point aggregator system;

a display interface module configured to display the reward points associated with each of the first account and the second account of the consumer at a display interface of a user computer device, to display at the display interface of the user computer device a display interface tool on a display screen, and to receive from the display interface tool a conversion factor entered by the consumer for a first portion of the reward points of the first account and/or the second account, wherein the consumer can increase or decrease the conversion factor;

a consumer interface module in communication with the display interface module that links the rewards account of the consumer with a rewards account of a second consumer enrolled in the reward point aggregator system, receives a bid from the second consumer to purchase the first portion of the reward points of the first account and/or the second account from the consumer based on the conversion factor entered by the consumer, and to transfer the first portion of the reward points of the first account and/or the second account of the consumer's reward account to the reward account of the second consumer;

an aggregator module configured to convert a second portion of the reward points associated with the first account and/or the second account into reward money by applying a first conversion factor for the first account and a second conversion factor for the second account and to combine the reward money from the first account and the second account to provide aggregated reward money;

a charity interface module in communication with the aggregator module, the charity module configured to receive a current geographic location of the consumer, to identify one or more charity organizations near the consumer's current geographic location, to transmit a request to a user computer device of the consumer for a donation, the request having one or more selection options for a consumer to donate all or a portion of the second portion of the rewards points of the first account and/or the second account to the one or more charity organizations to be displayed on the display interface of the user computer device, and to receive a selection of the one or more charity organizations and a portion or all of the second portion of the reward points of the first account and/or the second account to be donated to the one or more charity organizations from the user computer device; and a rewards store module in communication with the charity interface module and the aggregator module, the rewards store module being configured to, in response to the selection of the one or more charity organizations and a portion or all of the second portion of the reward points of the first account and/or the second account to be donated, deduct the portion or all of the second portion of the reward points of the first account and/or the second account to be donated from the first account and the second account, and transmit the reward money associated with the donated rewards points to the one or more charity organizations.

10. The point aggregator computer system of claim 9, further comprising:
a merchant interface module configured to receive products and/or services from merchants desiring to list the products and/or services for sale in the reward point aggregator system;
wherein the display interface module is in communication with the rewards store module and configured to display a populated rewards store to the consumer at the display interface of the user computer device.

11. The point aggregator computer system of claim 10, wherein the issuer interface module is further configured to receive the first conversion factor from the first issuer computer system, and the second conversion factor from the second issuer computer system.

12. The point aggregator computer system of claim 11, wherein the rewards store module is further configured to determine whether products and/or services are approved for inclusion in a rewards store based on whether each of the products and/or services have a price that is equal to or less than an amount of the aggregated reward money, to populate the rewards store with the approved products and/or services, and store each of the products and/or services that are not approved, wherein the products and/or services that are not approved have a price that is greater than the amount of the aggregated reward money.

13. The point aggregator computer system of claim 12, wherein the rewards store module does not populate the rewards store with the products and/or services that are not approved.

14. The point aggregator computer system of claim 9, further comprising a validation module involved in confirming a legitimacy of each of the one or more charity organizations.

15. A computer-implemented method performed by a point aggregator computer system of a reward point aggregator system, comprising:
receiving, via one or more processors, reward points associated with a first account held by a consumer from a first issuer computer system over a network;
receiving, via the one or more processors, reward points associated with a second account held by the consumer from a second issuer computer system over the network;
registering the first account and the second account of the consumer with the reward point aggregator system to enroll the consumer in a rewards account with the reward point aggregator system;
transmitting, via the one or more processors, the reward points associated with each of the first account and the second account of the consumer to a user computing device for display at a display interface;
displaying, at the display interface via the one or more processors, a display interface tool to the consumer on a display screen;
receiving, via the one or more processors from the display interface tool displayed on the display screen, an entered conversion factor for a first portion of the reward points of the first account and/or the second account, wherein the consumer can increase or decrease the conversion factor;
linking, via the one or more processors, the rewards account for the consumer with a rewards account of a second consumer enrolled in the reward point aggregator system;
receiving, via the one or more processors, a bid from the second consumer to purchase the first portion of the reward points of the first account and/or the second account from the consumer based on the conversion factor entered by the consumer;
transferring, via the one or more processors, the first portion of the reward points of the first account and/or the second account of the consumer's rewards account to the rewards account of the second consumer;
identifying one or more charity organizations near the consumer's current geographic location;
transmitting, via the one or more processors, one or more selection options for a consumer to donate all or a portion of a second portion of the rewards points of the first account and/or the second account to the one or more charity organizations to be displayed on a display interface of the user computer device;
receiving, via the one or more processors, a selection of the one or more charity organizations and a portion or all of the second portion of the reward points of the first account and/or the second account to be donated to the one or more charity organizations from the display interface of the user computer device;
in response to the selection of the one or more charity organizations and a portion or all of the second portion of the reward points of the first account and/or the second account to be donated, deducting the portion or all of the second portion of the reward points of the first account and/or the second account to be donated from the first account and the second account; and
transmitting, via the one or more processors, the donated rewards points to the one or more charity organizations.

16. The computer-implemented method of claim 1, further comprising:
receiving, via the one or more processors, a transaction purchase request from a merchant computer over the network for the consumer making a purchase with all or a portion of the aggregated reward money.

17. The point aggregator computer system of claim 9, wherein the charity interface module receives the current geographic location of the consumer from a processing network computer system when the processing network computer system is processing a transaction request for a purchase by the consumer with all or a portion of the aggregated reward money.

* * * * *